United States Patent [19]
Vachris et al.

[11] Patent Number: 5,072,410
[45] Date of Patent: Dec. 10, 1991

[54] PORTABLE "T"-CONFIGURED X-Y PLOTTER

[76] Inventors: Paul F. Vachris, 501 Coconut St., SE., Palm Bay, Fla. 32909; Thomas A. Rodby, 1527 Willard Rd., NW., Palm Bay, Fla. 32907

[21] Appl. No.: 449,676
[22] Filed: Dec. 12, 1989
[51] Int. Cl.$^5$ ............................................. G06K 15/00
[52] U.S. Cl. .................................. 395/103; 346/139 R
[58] Field of Search ....................... 364/519, 520, 237.7, 364/929.3; 346/139 R, 139 C, 139 D; 74/89.14

[56] References Cited

U.S. PATENT DOCUMENTS 4,600,083 7/1986 Parent et al. ...................... 346/139 B Primary Examiner—Arthur G. Evans
Attorney, Agent, or Firm—Evenson, Wands, Edwards, Lenahan & McKeown

[57] ABSTRACT

A portable, X-Y plotter capable of plotting on any sized medium and work surface comprises a generally T-configured instrument transport assembly for controllably imparting a dual (X-Y) axis translation to an instrument (e.g. plotting pen) across a workpiece (paper) and controllably engaging the plotting pen with the paper during its translation. The transport assembly includes a first, generally cylindrical translation arm, which forms the top of the T-configuration and extends in a first axial direction. This first translation arm is supportable at its opposite ends on a work surface, such as a table top, upon which plotting paper is disposed. A second, generally cylindrical translation arm, which forms the vertical leg of the T, is coupled through a T-joint coupler to the first translation arm, so that the second translation arm extends in a second axial direction, orthogonal to said first axial direction. The opposite end of the second translation arm free wheels on the support surface. A plotting pen holder, which retains a plotting pen for controllable engagement with the paper, is mounted on the second translation arm for translational movement in the second direction. A dual stepper motor unit in the T-joint coupler drives a rack and pinion for the first arm and a drive belt for the pen holder. For optimal high speed operation, the stepper motors are ramped up to maximum speed, and then ramped down to avoid pen overshoot.

44 Claims, 9 Drawing Sheets

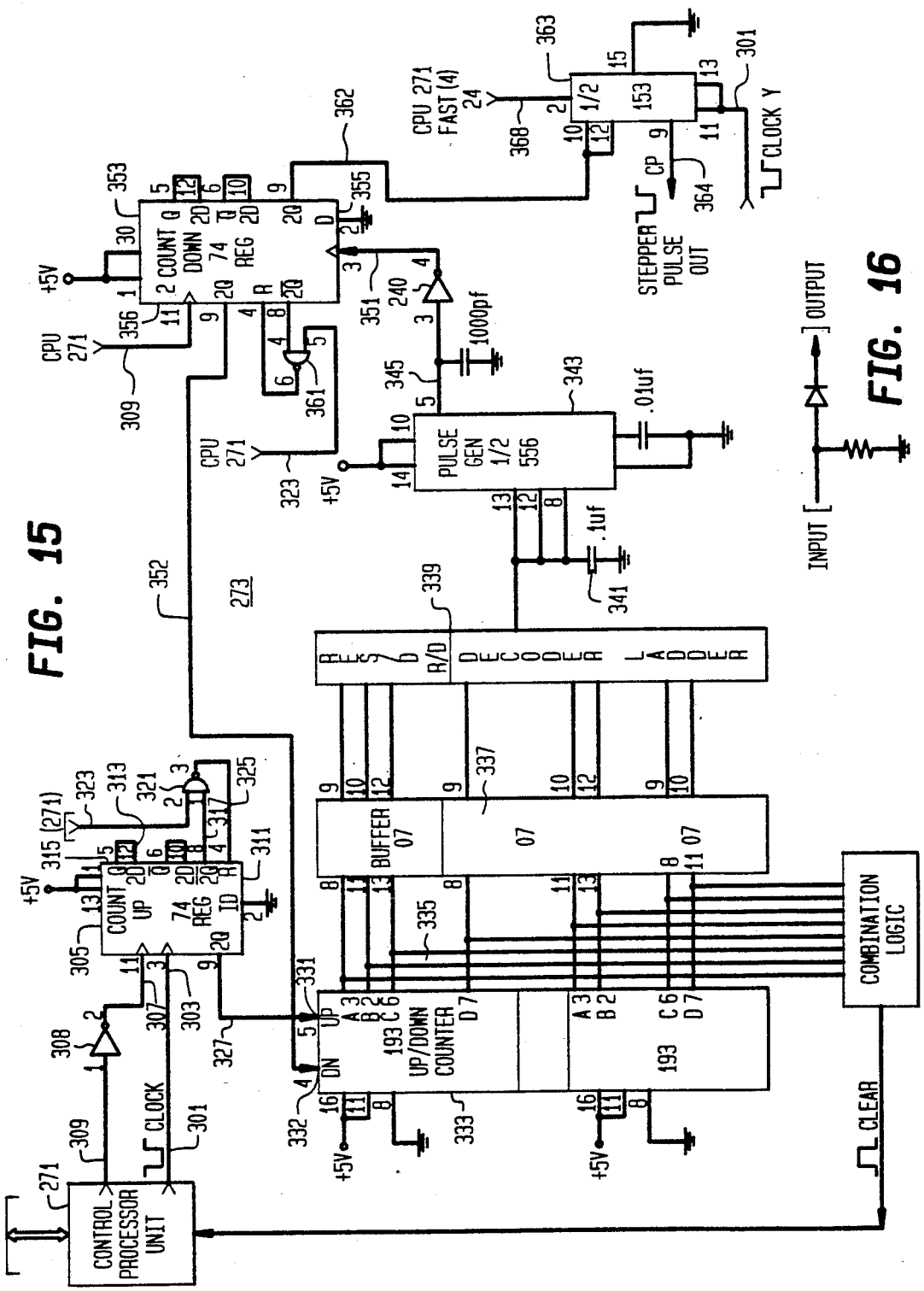

PORTABLE "T"-CONFIGURED X-Y PLOTTER

FIELD OF THE INVENTION

The present invention relates in general to X-Y plotters, such as those employed for CAD graphics applications, and is particularly directed to a portable, "T"-configured X-Y plotter, that may be mounted on and engage (plot on) substantially any work surface, regardless of the size and texture of the plotting work area.

BACKGROUND OF THE INVENTION

Graphical plotting instruments, such as those employed in computer aided design (CAD) and computer aided engineering (CAE) applications, are currently of two general types. The first is a roller type plotter, in which a roll of paper, on which an image is to be plotted, is unwound as a pen carriage moves along a rectilinear travel path parallel to the cylindrical axis of the roll. Roller type plotters are generally stand alone units, accommodating a fixed paper width associated with a particular plotting application. The second general class of plotter is the bed, or table, plotter, having a bed (support plate) that is sized to accommodate a limited paper size (e.g. C/D, B/C, or A/B), and which contains a pair of parallel drive tracks along opposite edges of the bed for driving a plotting pen translation bar back and forth over the bed surface. Like the roller plotter, in addition to its limited paper size, the bed plotter is hardware intensive, occupying a substantial workstation area, even when not in use. Moreover, in each of these conventional classes of plotters, the fixed separation between the plotting pen translation mechanism and the paper working surface limits the thickness and surface topology of the web material over which the pen travels.

SUMMARY OF THE INVENTION

In accordance with the present invention, there is provided a new and improved plotter apparatus that not only does not suffer from the paper size and cumbersome hardware constraints of conventional roller and bed type plotter systems, but is configured so that it may be readily disassembled, making it portable in a practical sense. In addition, because the plotter apparatus of the present invention is not constrained by mounting-/support hardware, it may be readily mounted for use on substantially any plotting surface regardless of its size.

In order to achieve this versatility, the present invention comprises a generally T-configured instrument transport assembly for controllably imparting a dual (X-Y) axis translation to an instrument (e.g. plotting pen) across a workpiece (paper) and controllably bringing the plotting pen into engagement with the paper during its translation. Pursuant to a preferred embodiment of the invention, the transport assembly includes a first, lightweight (polycarbonate plastic), generally tubular (e.g. cylindrical) rectilinear translation arm, which forms the top of the T-configuration and extends in a first (e.g. X) axial direction. This first translation arm is supportable at its opposite ends on a work surface, such as a table top, upon which web material (plotting paper) is disposed. A second, similarly lightweight, generally tubular (e.g. cylindrical) rectilinear translation arm, which forms the vertical leg of the T, is coupled through a T-joint coupler to the first rectilinear translation arm, so that the second translation arm extends in a second (e.g. Y) axial direction, orthogonal to said first axial direction. The T-axial joint coupler surrounds the first translation arm and contains a set of bearings that ride on the outer surface of the arm. The T-joint coupler also permits the second translation arm to be pivoted away from the work surface. The opposite (second) end of the second translation arm is supported on a roller wheel, so as to be free-travelling on the support surface. A plotting pen holder, which retains a plotting pen for controllable engagement with the paper, is mounted on the second translation arm for translational movement in the second (Y) direction.

A dual stepper motor drive unit, containing respective X and Y stepper motors, is mounted within the T-joint coupler. The output drive shaft of the X stepper motor is coupled to a pinion gear that engages a rack within the first translation arm. Operation of the X stepper motor causes the T-joint coupler, and thereby the Y translation arm and accompanying pen holder, to be controllably translated in the X direction. The output drive shaft of the Y stepper motor is coupled to a drive belt that extends through the Y translation arm and is affixed to the pen holder. The drive belt is looped via sets of pulleys at opposite ends of the Y translation arm, so that operation of the Y stepper motor moves the belt and causes the pen holder to be controllably translated in the Y direction along the Y translation arm.

The plotting pen holder comprises a sleeve member that surrounds the Y translation arm and contains a set of internal bearings that ride on the outer surface of the Y translation arm, so that, like the T-joint coupler, the pen holder member effectively floats on the Y translation arm as it is controllably translated in the Y direction. The sleeve member also contains an internal bracket that is affixed to the Y drive belt and to a flexible conductor cable which, together with the drive belt, travels along the interior of the Y translation arm during translation of the pen holder by operation of the Y stepper motor. A solenoid unit is mounted on the sleeve member and is controllably energized through the flexible conductor cable for translating an output plunger pin that engages one end of a pen retention bracket. The pen retention bracket is pivotally mounted to the sleeve member and retains a plotting pen for engagement with a work surface (paper) over which the Y translation arm travels. As the solenoid unit is controllably energized, the plotting pen is translated into and out of engagement with the work surface.

The stepper motor drive unit includes circuitry for supplying drive pulses to each respective stepper motor at a fixed, moderate pulse repetition rate for pen movement over relatively small drawing areas, and at a variable pulse repetition rate for larger drawing regions. When supplying pulses at a variable pulse rate, the stepper motor pulse supply circuitry gradually increases the supply of drive pulses from a reference level, so as to bring the speed of the motor up to a prescribed speed, and subsequently gradually decreases the supply of drive pulses to the motor, so as to gradually slow down the motor to a stop. This ramping up and ramping down of the stepper motor pulse stream enables the motor to be quickly brought up to its maximum operating speed, thereby minimizing pen travel time, while preventing the motor from locking at start up (due to the sudden application of a maximum speed pulse train), and avoiding overshoot at the end of the motor's excursion.

In a preferred embodiment, the drive pulse supply circuitry comprises an up/down counter to which a prescribed number of stepping control pulses, representative of a preselected advance or excursion of the stepper motor, are coupled from a system microcontroller. The contents of the up/down counter are coupled through a resistor/diode ladder decoder, time constant control network for controlling the output frequency of a variable frequency pulse generator in accordance with the contents of the up/down counter. The output of the pulse generator is monitored by a feedback counter control circuit, for decreasing the contents of the up/down counter in accordance with the frequency of output pulses generated by the variable frequency pulse generator. This feedback mechanism permits the pulse output rate of the pulse generator to initially be ramped up to a preset motor drive representative rate by the input pulse train. Then, once the input pulse train is terminated in accordance with the intended advance of the motor, the contents of the up/down counter begin to decrease, rapidly at first and then gradually as the frequency of the pulse generator is ramped down in accordance with the decreasing contents of the counter. Stepper motor drive pulses are coupled to the stepper motor in accordance with output pulses generated by the variable frequency pulse generator.

BRIEF DESCRIPTION OF THE DRAWINGS

FIG. 15 is a schematic/logic diagram of a preferred embodiment of the drive pulse control circuitry for a respective stepper motor;

FIG. 16 shows an individual segment of a resistor/diode time constant scaling circuit.

DETAILED DESCRIPTION

Figure 1:
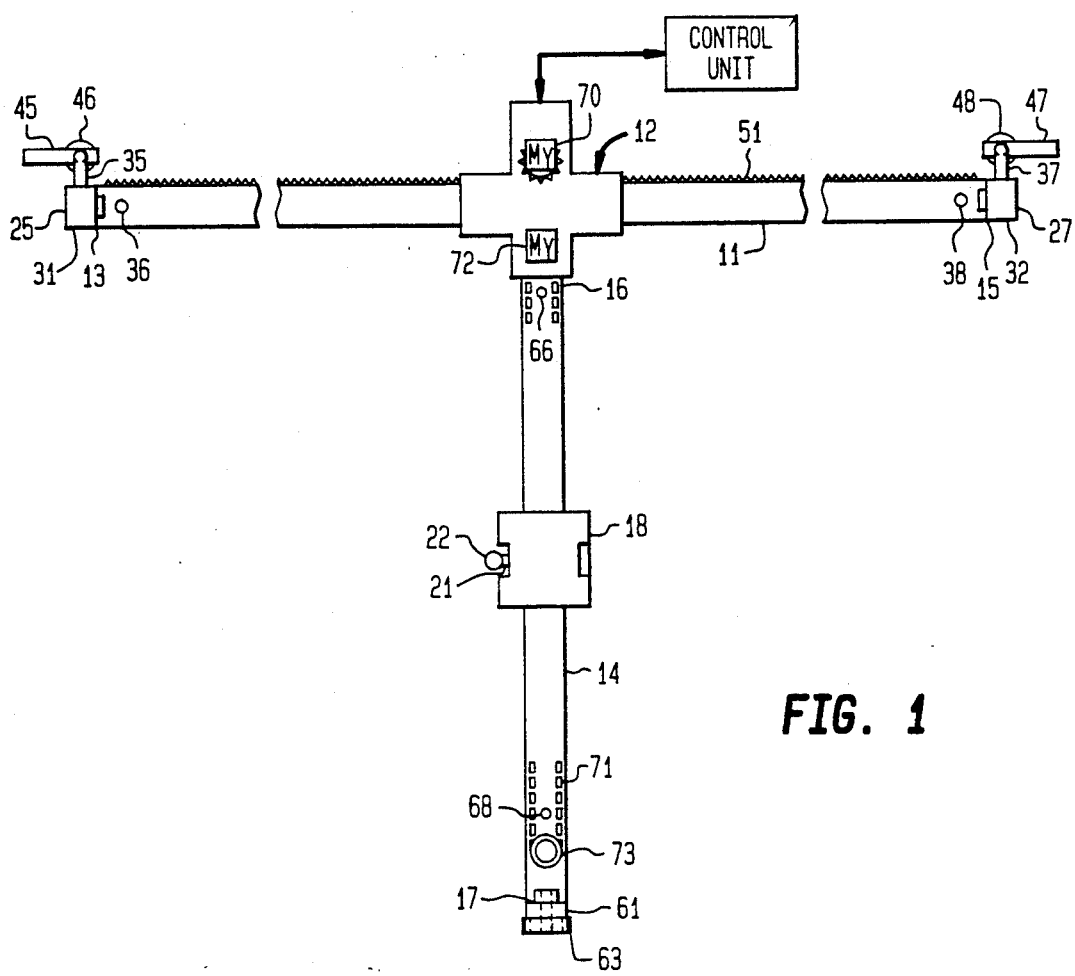
FIG. 1 is a diagrammatic plan view of the generally T-configured X-Y plotter of the present invention.
Figure 2:
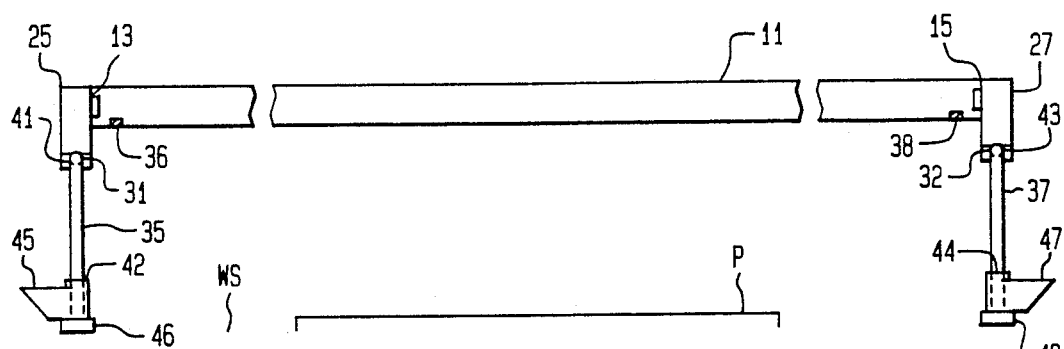
FIGS. 2 and 3 are respective longitudinal side and end views of the X-translation arm of the plotter shown in FIG. 1.
Figure 3:
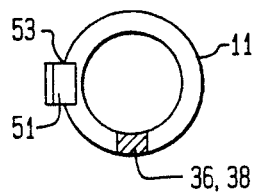

Referring now to FIG. 1, a diagrammatic top or plan view of the generally T-configured X-Y plotter of the present invention is shown as comprising a first, generally tubular (e.g. cylindrical) rectilinear translation arm 11, which forms the top of the T-configuration and extends in a first (e.g. X) axial direction, and a second, generally tubular rectilinear translation arm 14, which forms the central leg of the T-configuration and extends in a second (e.g. Y) axial direction, orthogonal to X-arm 11. Translation arm 11, respective longitudinal side and end views of which are shown in FIGS. 2 and 3, may be formed of lightweight polycarbonate plastic and is supportable at its opposite ends 13 and 15 upon a work surface WS, such as a table top, upon which web material (e.g. plotting paper) P is disposed. Arm 11 is supported on work surface 17 by means of a pair of support brackets that are inserted into the opposite ends of the tubular arm and rest upon work surface WS.

As shown in FIG. 2, each support bracket comprises a circular tube insert element 25, 27, sized to fit within an open end of tubular X-arm 11, and has a slot or bore 31, 32, into which one end of a generally L-shaped rod member 35, 37 is inserted and clamped by a locking ring 41, 43. X-arm 11 is rotationally pivotable within its end support brackets, so that Y-arm may be lifted by way of its free wheeling end, off work surface WS, as necessary, for positioning of an underlying web. Captured within respective holes through arm 11 and adjacent to the opposite ends of the tube are permanent magnet elements 36, 38 which cooperate with magnetic sensor elements carried by a T-joint coupler 12, so as to delimit the ends of the ±X-direction of travel along arm 11. Rod members 35 and 37 pass through bores 42 and 44 of respective clamp members 45 and 47, so that the clamp members may slide along rod members 35 and 37. Adjustment knobs 46, 48 are threaded onto the lower ends of rod members 37, 37 of clamp members 45, 47. By rotational adjustment of clamps 45 and 47 and knobs 46, 48 the (horizontal) orientation of translation arm 11, relative to work surface 17 may be precisely defined.

A (nylon) rack 51 is mounted (e.g. bonded) within a longitudinal slot 53 which extends along the length of the arm 11 parallel to the X axis. As will be described below, rack 51 mates with a pinion gear element, that is affixed to the output shaft of an X-axis stepper motor 70 housed within T-joint coupler 12, so that as the X-axis stepper motor is pulsed and the pinion is rotated, causing it to travel along rack 51, coupler 12 is translated along X-axis translation arm 11. The output shaft of X-axis stepper motor 70 also has a pair of disk guides of each side of the pinion gear element for aligning and guiding the rack with the pinion gear element.

Figure 4:
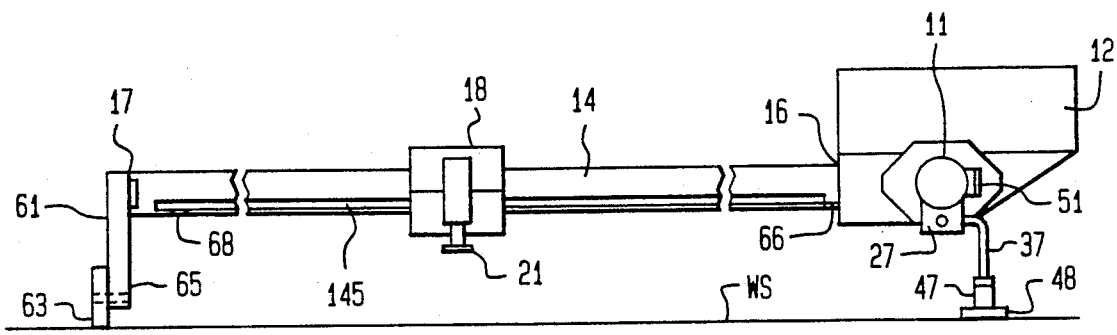
FIGS. 4 and 5 are respective end and longitudinal side views of the Y-translation arm of the plotter shown in FIG. 1.
Figure 5:
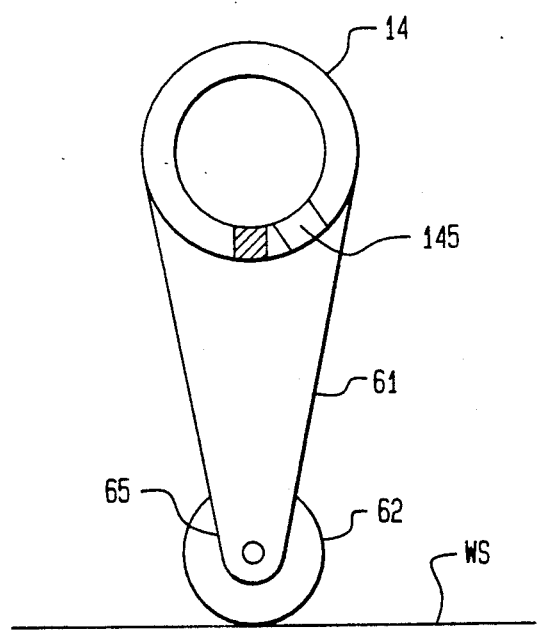

The vertical leg of the "T"-configured plotter assembly is comprised of a second, generally tubular (e.g. a section of cylindrical polycarbonate plastic) rectilinear translation arm 14, a first end 16 of which is coupled to T-joint coupler 12, so that translation arm 14 extends across the work surface in a second (e.g. Y) axial direction, orthogonal to the X direction of arm 11. Y arm 14 has a longitudinal slot 145, directed at an angle on the order of 60° from the horizontal. Slot 145 extends substantially the length of the arm, for permitting a pen holder bracket to be coupled with and translated by a drive belt at the interior of arm 11, while supporting a pen retention bracket at the exterior of the arm. The opposite end 17 of Y translation arm 14, respective end and longitudinal side views of which are diagrammatically shown in FIGS. 4 and 5, is coupled to a roller wheel support bracket 61, which is inserted into the open end of tubular arm 14 and carries a wheel 63 at its lower end portion 65, so that the opposite end 17 of Y-arm 14 may be free wheeled in the X-direction across work surface 17, as arm 14 is translated, via T-joint coupler 12, along X-arm 11. As in the case of X-arm 11, with respective holes adjacent to each end of arm 12 are permanent magnet elements 66, 68, which cooperate with magnetic sensor elements carried by a plotting pen holder 18, that rides on Y-arm 12, so as to delimit the Y-direction travel path of pen holder 18 along arm 12.

Plotting pen holder 18 is supported on Y-translation arm 12 for translational movement in the Y direction by means of a set of internal bearings (not shown in FIG. 1). Pivotally attached to pen holder 18 is a plotting pen fixture 20 for holding a plotting pen 22 for controllable engagement with the paper 19 on work surface WS. Pen holder 18 is attached to a Y-drive timing belt 71 which is formed as an endless loop and extends through the interior bore of Y-arm 14. Belt 71 is engaged by the output drive pulley of a Y-stepper motor 72 within T-joint coupler 12 and loops around an idler pulley 73 in the free wheeling end 17 of arm 14. As pointed out above, operation of the X stepper motor 70 causes T-joint coupler 12, and thereby Y translation arm 14 and accompanying pen holder 18, to be controllably translated in the X direction across work surface WS. Similarly, operation of Y stepper motor 72 moves drive belt 71 and causes pen holder 18 to be controllably translated along Y translation arm 14.

Figure 6:
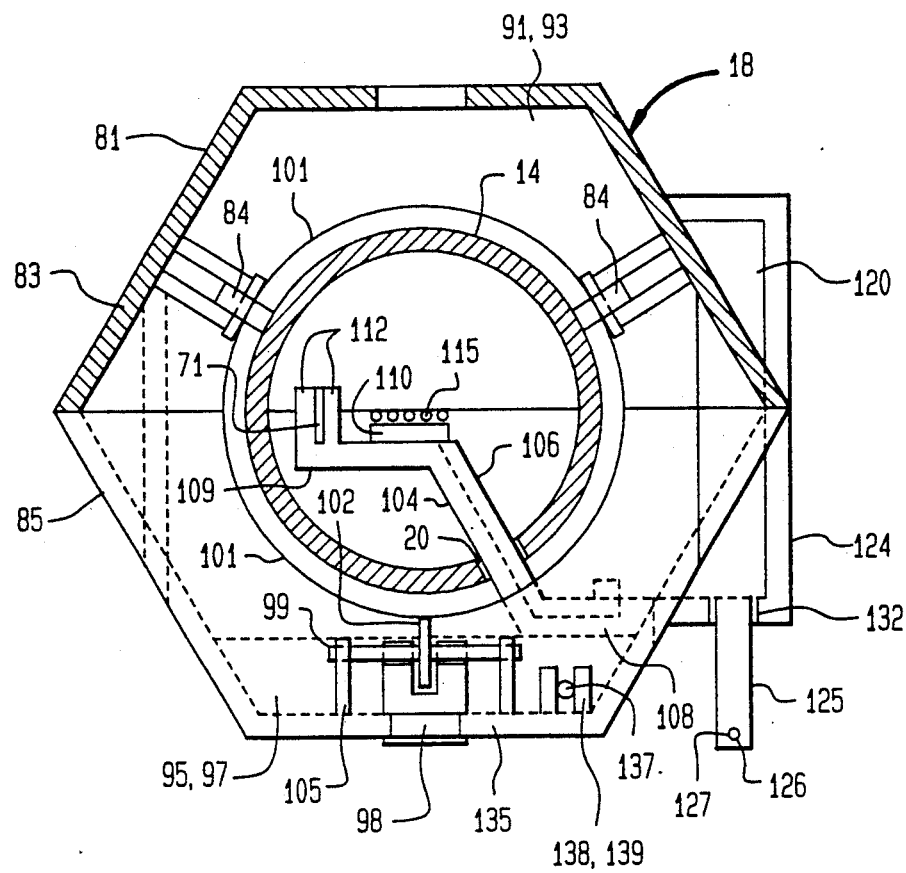
FIG. 6 is a diagrammatic sectional end view of the plotting pen holder.
Figure 9:
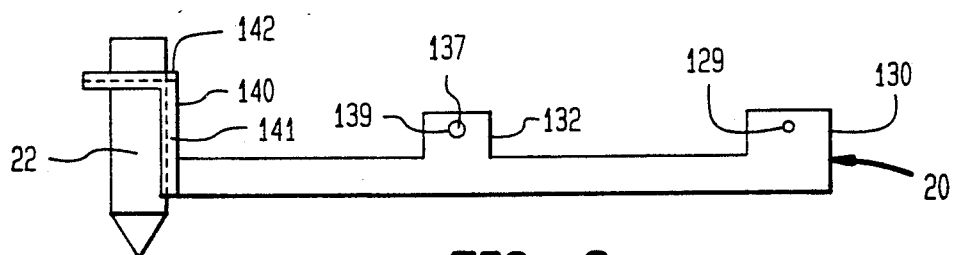
FIG. 9 is a side view of a pen retention fixture.
Figure 10:
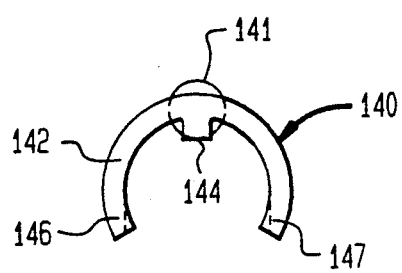
FIGS. 10 and 11 are respective top and end views of a pen retention bracket.
Figure 11:
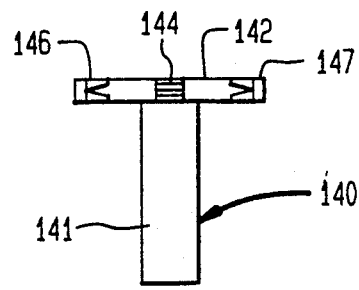
Figure 7:
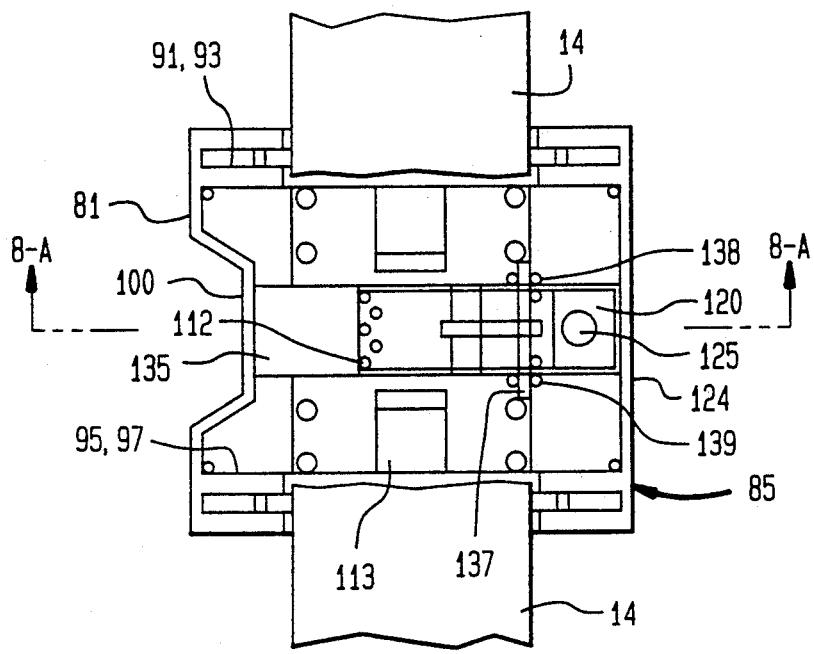
FIG. 7 is a diagrammatic sectional top view of the lower housing portion of the plotting pen holder.
Figure 8:
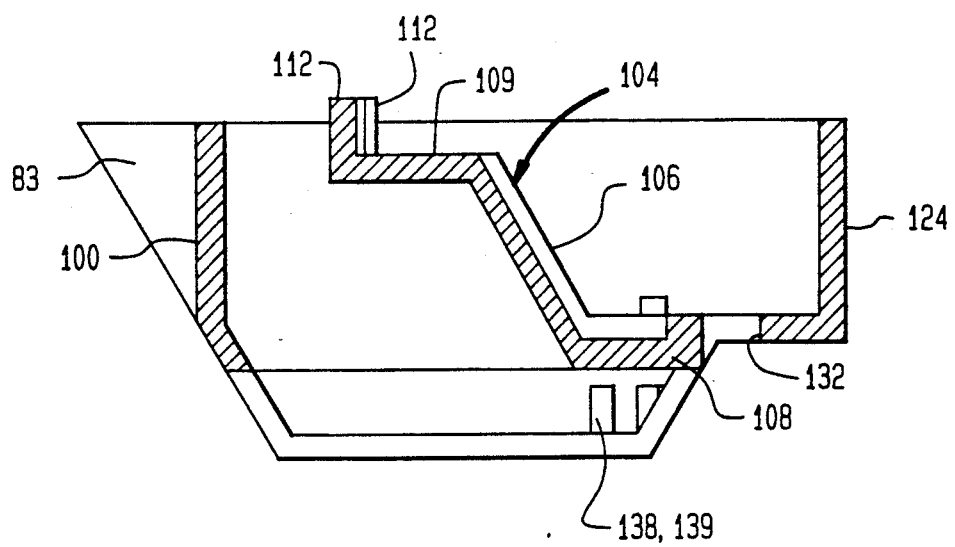
FIG. 8 is a diagrammatic sectional view of the lower housing portion of the plotting pen holder taken along lines 8-A/8-A in FIG. 7.

Plotting pen holder 18 is shown in detail in FIGS. 6–11 as comprising a generally hexagonally-shaped polycarbonate plastic housing 81, formed of an upper housing portion 83 that is aligned and mated with a lower housing portion 85 via a set of internal pins (not shown). Upper housing portion 83 has a pair of end walls 91, 93, and lower housing portion 85 has a pair of end walls 95, 97 the edges of which abut flush with end walls 91, 93 when upper and lower housing portions 83 and 85 are joined together. Each end wall has a semicircular aperture 101 of a diameter slightly larger than that of Y-arm 14, so as to permit arm 14 to easily pass through housing 81 when the upper housing portion 83 and lower housing portion 85 are joined together. In addition, as shown in FIG. 7, one side of each housing portion has a recessed wall portion 100 to accommodate the close pivoting of a pen retention bracket and the plotting pen it holds. The opposite side of each housing portion has a 'bay window'-type enclosure 124 in which a solenoid unit for controllably pivoting the pen retention bracket is seated. A plurality (e.g. three pairs) of geometrically distributed roller bearing elements 84 are mounted to interior wall portions of housing 81, so that housing 81 effectively rides on the outer surface of Y-arm 14. One of the roller bearing elements is supported on an adustable cam element, so as to take up any play between Y-arm 14 and the bearings and thereby ensure a smooth travel path for the pen holder during its travel along Y-arm 14.

Figure 7A:
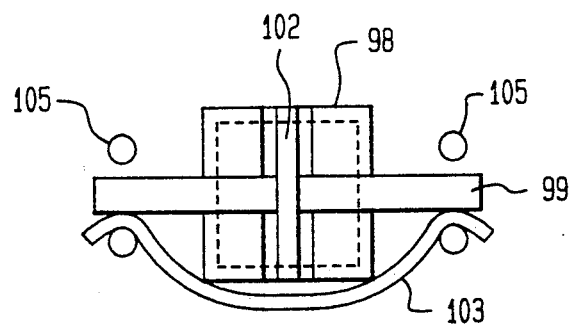
FIGS. 7A, 7B and 7C show the details of the mounting of a bearing cam block to the lower housing portion of the plotting pen holder.
Figure 7B:
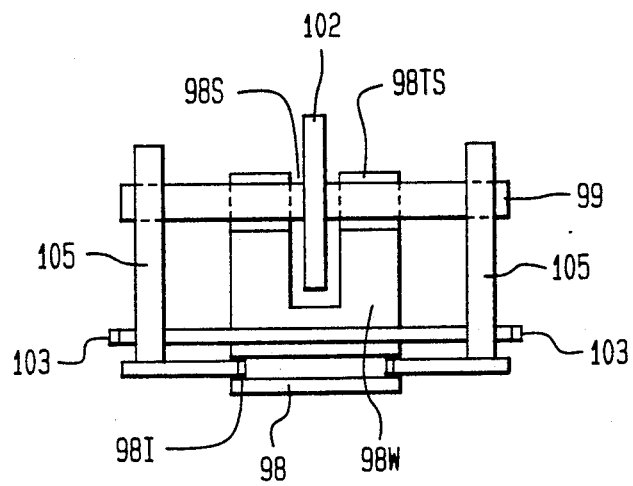
Figure 7C:
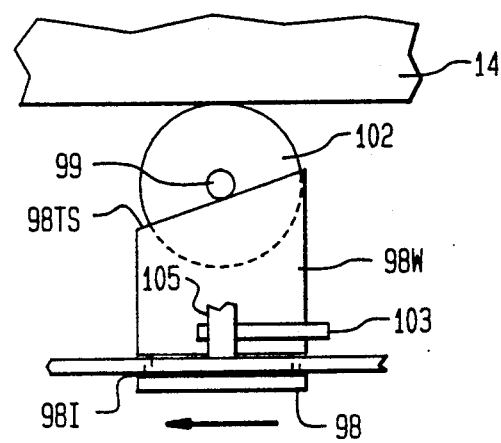

More particularly, as shown in FIGS. 6 and 7, the bottom of lower housing portion 85 has a generally rectangular opening 113 through which a bearing cam block 98, shown in detail in FIGS. 7A, 7B and 7C, is inserted an captured at a circumferential indented region 98I. Bearing cam block 98 has a pair of vertically extending, parallel cam walls 98W on an inclined cam surface 98TS of which a wheel bearing shaft 99 of a wheel bearing 102 rides, such that the wheel bearing is free to rotate in a slot 98S between cam walls 98W. A wire spring 103 is captured between two of a set of four posts 105 and bearing cam block 98. Wheel bearing shaft 99 is retained between posts 105, so that wheel bearing 102 is oriented for rotation in slot 98S between cam walls 98W. Spring 103 biases bearing cam block parallel to the longitudinal axis of Y-arm 14, such that cam surface 98TS continually urges wheel bearing 102 into contact with the outer surface of Y-arm 14, and thereby maintains Y-arm 14 snugly supported by the roller bearing elements.

Lower housing portion 85 further includes a drive belt, control cable retention bracket 104 having an inclined bracket portion 106 affixed to an interior base 108 and extending to a generally horizontal bracket portion 109. When the pen holder is installed on Y-arm 14, inclined bracket portion 106 passes through a longitudinal slot 145 that extends the length of the arm. The outer end of horizontal bracket portion 109 carries two offset rows of closely spaced pins or posts 112 through which drive belt 71 may be secured to retention bracket 104. Horizontal bracket portion 109 serves as a mounting surface for a magnetic sensor element 110 and one end of a flexible control cable 115 that passes through the interior bore of Y-arm 14. Control cable 115 carries a set of conductors for a magnetic sensor element 110, and a set of conductors for energizing a solenoid unit 120, supported within enclosure 124, which extends rearwardly of interior base 108 and has an aperture 132 through which an output plunger pin 125 of the solenoid unit 120 passes for engaging one end of pen retention fixture 20.

In particular, output plunger pin 125 has a hole 126 through which a pivot pin 127 passes and is captured by a corresponding pair of alignment holes 129 within a pair of tabs 130 on one end of pen retention fixture 20. Pen retention fixture 20 has a further pair of tabs 132, which extend through slot 135 in lower housing portion 83 and are pivotally captured by a pin 137. Pin 137 is retained between first and second pairs of support posts 138, 139 on the interior floor portion of lower housing portion 85 adjacent to slot 135.

The opposite end of pen retention fixture 20 has a vertically extending plotting pen retention bracket 140, comprised of a vertical support rod 141 and a generally horizontal notched ring portion 142. Ring portion 142 has a central tab portion 144 which, together with ring end portions 146, 147, is V-grooved to provide a snap ring capture fit for a vertically extending plotting pen 22 for engagement with a work surface (paper) over which the Y translation arm travels. As solenoid unit 120 is controllably energized, pen retention fixture 20 is pivoted about the axis of pin 137, so that plotting pen 22 is translated into and out of engagement with the work surface.

Figure 12:
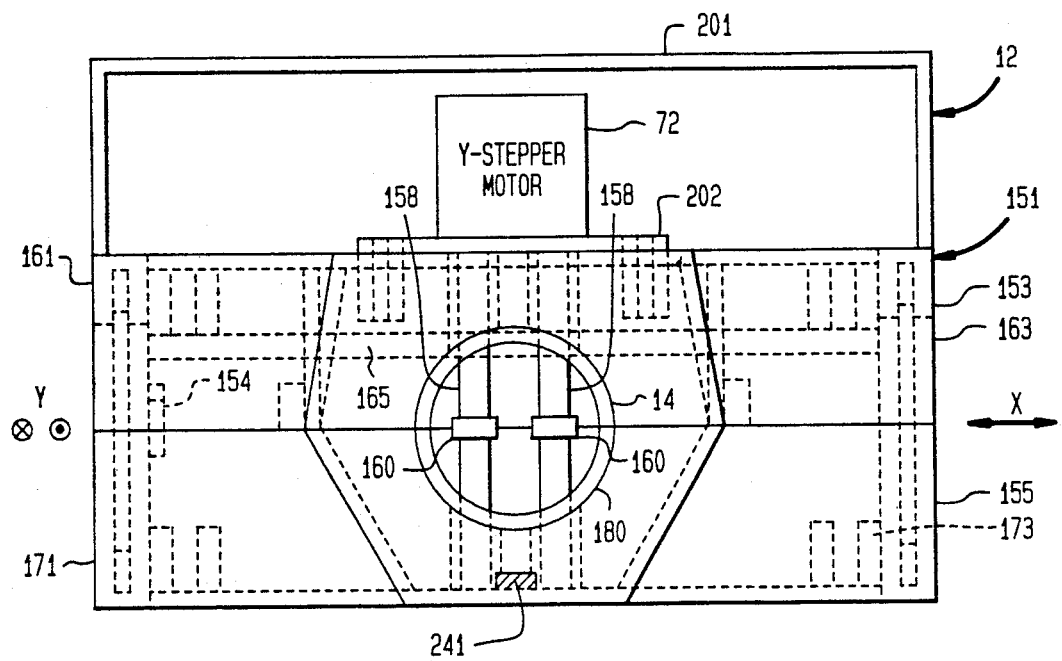
FIG. 12 is a diagrammatic sectional end view of the T-joint coupler as seen along the Y axis.
Figure 13:
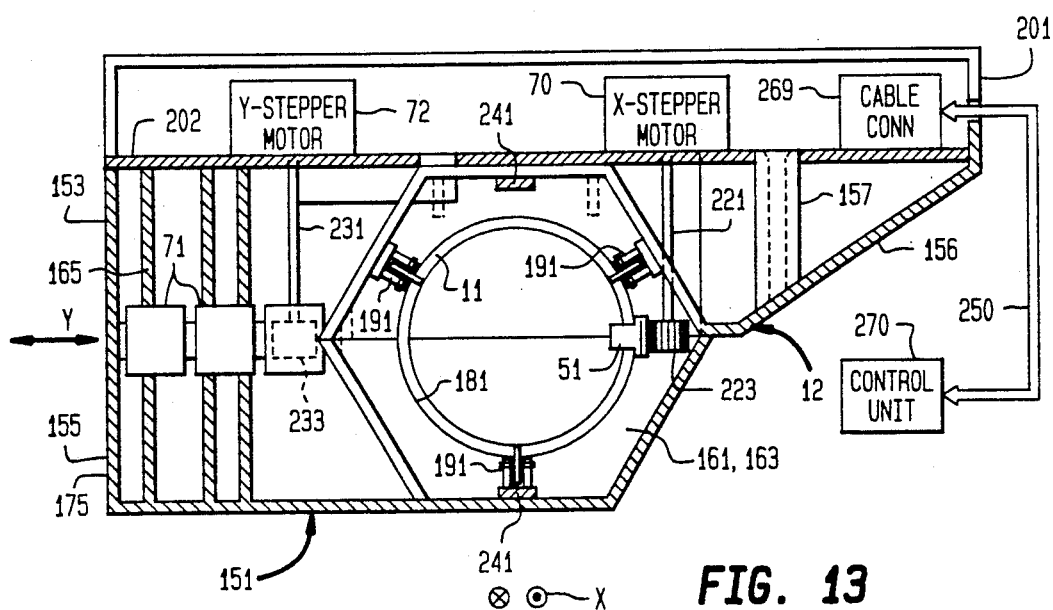
FIG. 13 is a diagrammatic section top view of the T-joint coupler as seen along the Y axis.
Figure 14:
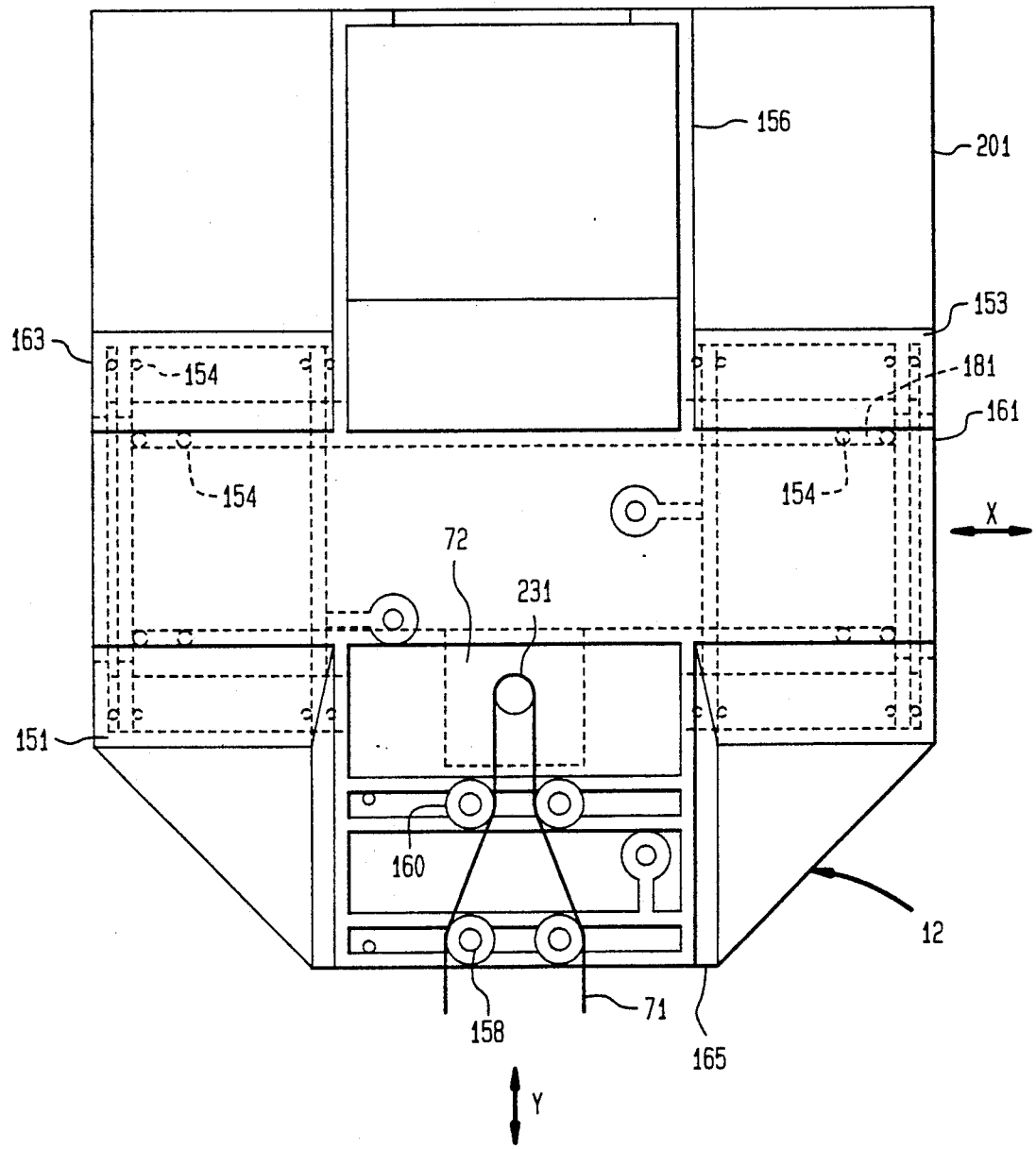
FIG. 14 is a diagrammatic sectional view of the upper housing portion of the T-joint coupler.

Referring now to FIGS. 12-14, the configuration of T-joint coupler 12 is shown as comprising a generally T-shaped housing 151 of hexagonal cross-section formed of an upper T-shaped housing portion 153 that is aligned and mated with a T-shaped lower housing portion 155 via a set of internal pins 154. Upper housing portion 153 has a pair of end walls 161, 163 extending orthogonal to the X direction and a central end wall 165 extending orthogonal to the Y direction. Similarly, lower housing portion 155 has a pair of end walls 171, 173 extending orthogonal to the X direction and a central end wall 175 extending orthogonal to the Y direction. The bottom edges of ends walls 161, 163, 165 of upper housing portion abut flush with end walls 171, 173 and 175 of lower housing portion, when upper and lower housing portions 153 and 155 are joined together. Each end wall has a semicircular aperture 181 of a diameter slightly larger than that of X-arm 11 and Y-arm 14, so as to permit arms 11 and 14 to easily pass through T-joint coupler 12 when the upper and lower housing portions of the coupler are joined together. Y-arm 14, which passes through the semicircular aperture 180 in central end walls 165, 175, is captured within T-joint coupler 12 by a set of four mutually-aligned pin halves 158 that are solid with and extend from interior surfaces of upper and lower housing portions 153 and 155 and pass through holes in Y-arm 14. Each of pins 158 has a respective pulley 160 for guiding drive belt 71 into Y-arm 14 from the output shaft 231 of its associated Y-stepper motor 72. A plurality (e.g. three pairs) of geometrically distributed roller bearing elements 191 are mounted to interior wall portions of the T-joint coupler adjacent the axial direction of X-arm 11, so that the T-joint coupler freely rides on the outer surface of X-arm 11. In addition, although not illustrated in FIGS. 12–14, for purposes of clarity, T-joint coupler 12 contains a bearing cam block as shown in FIGS. 7A–7C, described above, to maintain X-arm 11, snugly supported by the roller bearing elements.

As shown in FIG. 13, upper housing portion 153 further includes a rearwardly extending portion 156 and a support post 157 for supporting a printed circuit board 202 upon which wiring interconnect tracks for the stepper motors are provided. In addition, a cable connector 269, for providing electrical communication between a communication cable 250 an off-board control unit (microprocessor) 270 and the drive and sensor units of the system, is mounted within rearwardly extending portion 156. Mounted atop upper housing portion 153 is a vented cover 201.

Supported on printed circuit board 202 of upper housing portion 153 within T-joint coupler 12 are X-stepper motor 70 and Y-stepper motor 72. The output shaft 221 of X-stepper motor 70 carries a pinion 223 which engages rack 51, while the output shaft 231 of Y-stepper motor 72 carries a belt pulley 233 that engages drive belt 71. A magnetic position sensor element 241 is mounted at a central portion of lower housing portion 155. Like position sensors 110 in pen holder 18, sensor 241 is employed to demarcate the ends of travel of T-joint coupler 12 along X-arm 11.

Stepper motors 70 and 72 are incrementally driven by a stepper motor control unit 270, diagrammatically illustrated in FIG. 15, which is physically separated from stepper motors 70 and 72, but electrically connected to the motors and sensor components through cable connector 269 and printed circuit board 202 of upper housing portion 153. As shown in FIG. 15, drive unit 270 comprises a microprocessor-based control unit 271 containing resident microprocessor (e.g. a Zilog Z-80 chip), attendant memory (ROM and RAM chips) and interface circuitry for connection to a host plotter data source (e.g. personal computer), the magnetic sensors, pen fixture solenoid drive unit and to a stepper motor drive pulse control circuit 273. A source code print-out of the control software for control unit 271 is contained in a separate Appendix A, filed herewith.

Each of stepper motors 70 and 72 may comprise a 0.9 degree stepper motor, the maximum pulse drive input rate for which is 5000 pps. As will be described below, drive pulse control circuit 273 supplies drive pulses to each respective stepper motor at a fixed, moderate pulse repetition rate for pen movement over relatively small drawing areas, and at a variable pulse repetition rate for larger drawing regions. When supplying pulses at a variable pulse rate, stepper motor drive pulse control circuit 273 gradually increases the supply of drive pulses from a reference level, so as to bring the speed of the motor up to a prescribed speed, and subsequently gradually decreases the supply of drive pulses to the motor, so as to gradually slow down the motor to a stop. This ramping up and ramping down of the stepper motor pulse stream enables the motor to be quickly brought up to its maximum operating speed, thereby minimizing pen travel time, while preventing the motor from locking at start up (due to the sudden application of a maximum speed pulse train), and avoiding overshoot at the end of the motor's excursion.

A preferred embodiment of the drive pulse control circuitry for a respective one of the stepper motors 70 and 72 is illustrated in FIG. 15 as having an input line 301, which is coupled to the control processor 271 for receiving a sequence of stepper motor pulses representative of intended advance of the stepper motor. Input line 301 is coupled to a first clock input 303 of a 'count-up' dual register 305, a first D input 311 for which is coupled to a reference voltage level (e.g. ground). A second clock input 307 is coupled, via an inverter 308, to clock link 309 from control processor 271. The clock rate (e.g. 300 KHz) on clock link 309 may typically be in the neighborhood of several orders of magnitude greater than the pulse rate (e.g. 5 kpps) for a stepper motor, so that the stepper pulse signal on line 301 is relatively slow compared to the clock signal on link 309. A second D input 313 of register 305 is coupled to Q output 315. Its 2Q NOT output 317 is coupled to one input of NAND gate 321, a second input of which is coupled to link 323 over which a further clock signal from control processor 271 is supplied. The clock signal on link 323 is in phase with and twice the clock rate on link 309. The output of NAND gate 321 is coupled over line 325 to a reset D input of register 305. Register 305's 2Q. output is coupled over link 327 to a count-up input 331 of an up/down counter 333. Up/down counter 333 may comprise an eight bit binary counter, the contents the respective stages of which are coupled over links 335 through a set of open-collector buffers 337 to a time constant scaling circuit 339.

Time constant scaling circuit 339 is preferably comprised of a resistor/diode ladder network, an individual segment of which is shown in FIG. 16. The commonly connected outputs of the resistor segments are coupled with a capacitor 341 to the frequency control input of a variable frequency pulse generator 343. The values of successive ones of the resistor/diode components of the ladder network are such that, on a log/log scale, the relationship between resistance value and stepper motor pulse count (derived from the output of variable frequency pulse generator 343) is linear. The output of variable frequency pulse generator 343 is coupled over link 345 to a first clock input 351 of a 'count-down' dual register 353. The inputs and outputs frequency control input of variable frequency pulse generator 343, the output of which is coupled over link 345 to a first clock input 351 of a 'count-down' dual register 353. The inputs and outputs of register 353 are connected in substantially the same manner as dual register 305, with the 2Q output of register 353 being coupled over link 352 to the count-down input 332 of up/down counter 333. Thus, the first D input 355 of register 353 is coupled to a reference voltage level (e.g. ground), and a second clock input 356 is coupled to link 309. Similarly, clock link 323 is coupled to one input of a second NAND gate 361, a second input of which is coupled to the NOT 2Q output of register 353. The output of NAND is coupled to the reset input of register 353.

The 2Q output of register 353 is coupled over link 362 to an output driver circuit 363. The stepper motor output pulses from driver circuit 363 are coupled over output link 364 to the stepper motor. Driver circuit 363 has a further input coupled over link 368 to control processor 271 for receiving a separate, moderate rate pulse signal (e.g. 400 pps) to be selectively coupled to the stepper motor in those cases where the plotting pen excursion is confined to a limited area on the work surface. By moderate is meant a stepper motor pulse rate that is less than the maximum pulse rate rating for the stepper motor (e.g. the 5000 pps rate of the present example) but is sufficiently fast so that the pen can be rapidly moved within a reduced area of travel (e.g. as in the formation of alpha numeric characters), without a loss in overall system speed.

More particularly, the ideal operation of the stepper motor would be to always pulse the motor at its maximum rating. However, the sudden application of such a maximum rate pulse stream causes the motor to lock up. In order to drive the stepper motor at high pulse rates, including its maximum rating, it is necessary to gradually increase the rate at which the motor is pulsed. Consequently, when the control circuit of the present invention receives a high pulse rate stream, such as a sequence of pulses at the 5000 pps rate, rather than directly apply the high rate input to the stepper motor, it ramps up its pulse output, thereby advancing the output speed of the stepper motor in a manner that conforms with its response characteristics. On the other hand, although the motor will not tolerate the sudden application of a very high rate pulse rate input, it will follow a moderate rate pulse stream, such as one at the above-mentioned several hundred pps value. Thus, for relatively large pen excursions across the work surface, maximum effective pen speed is accomplished by ramping the motor up to maximum speed, and holding that speed over substantially the entire extent of the pen's travel path. To prevent overshoot and discontinuities at the end of the pen's excursion, the control circuitry of the present invention also ramps down the speed of the motor as it approaches the end of its advance. As a result the full capability of the stepper motor is obtained, without hindering the precision with which the pen is moved by the plotter. For limited travel distances (e.g. on the order of a half an inch), where ramping the motor would not be effective, control processor 271 bypasses the ramping mechanism and causes a direct feed of a moderate pulse rate signal to the motor.

Figure 17:
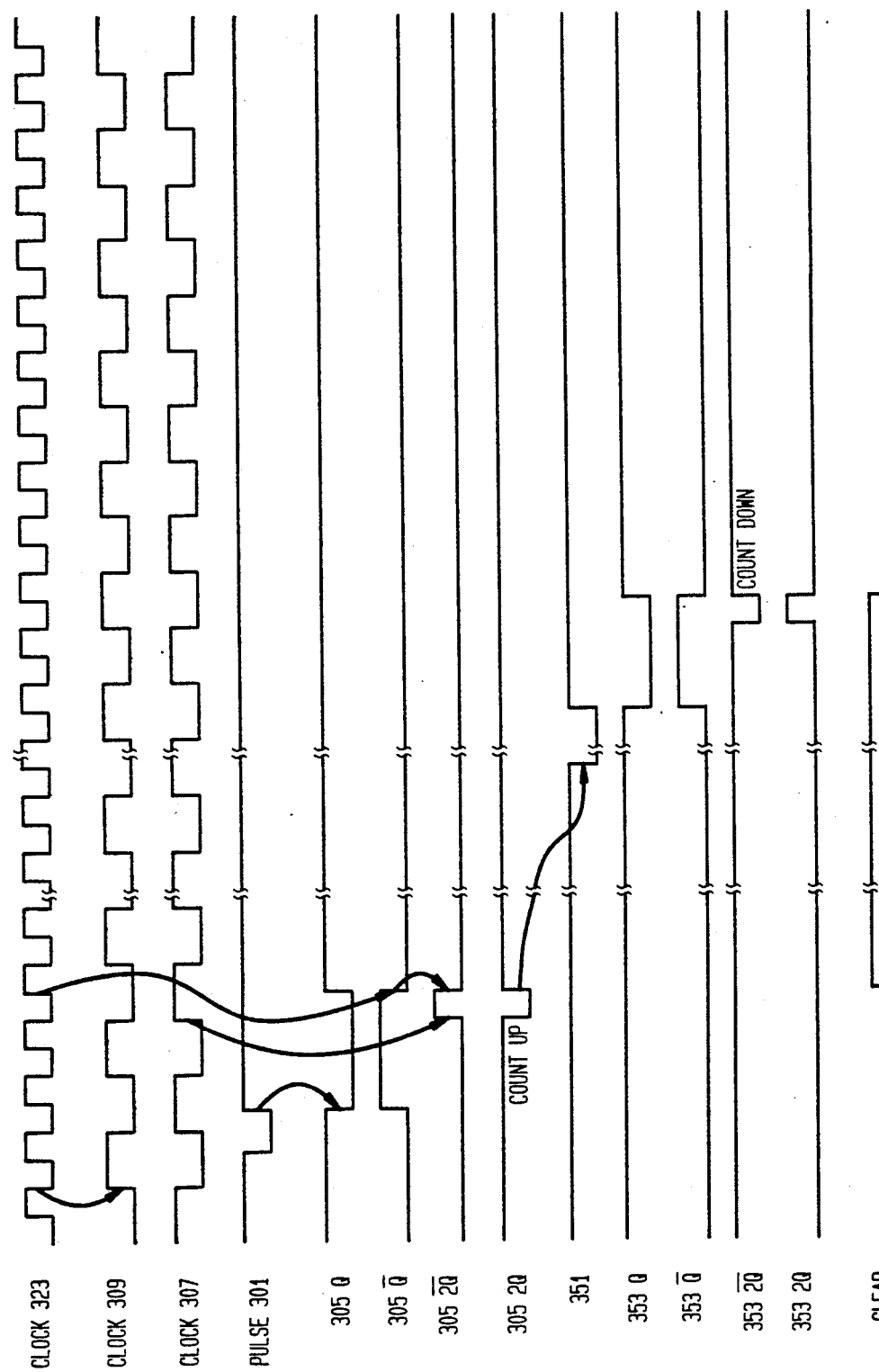
FIG. 17 is a timing diagram associated with the drive pulse control circuit of FIG. 15.

To facilitate an understanding of the operation of the pulse supply control circuitry shown in FIG. 15, attention may be directed to FIG. 17, which is a timing diagram associated with the circuit. The timing diagram illustrates the case of a signal stepper motor drive pulse on input link 301, in order to simplify the drawings.

It will be initially assumed that the up/down counter and all registers have been cleared and that, unless otherwise noted, logic components trigger on a positive-going edge. Moreover, up/down counter is of the type that opposite polarities are required at its respective up and down inputs for a count transition to occur. Specifically, to increment the counter, the down input must be high and the count-up input clocked low. Similarly, to decrement the counter, its up input must be high, and the count down input clocked low. Thus, both inputs are presently high. When a motor advance pulse is applied to clock input 303 of count-up register 305, a logical zero (ground potential applied to the first D input 311) is loaded into the first stage of register 305, causing its Q output 315 to go low and its Q NOT output to go high. Since its Q NOT output is coupled to the second D input of register 305, then upon next negative going transition of the clock input on link 309 (inverted by inverter 308), the 2Q and 2Q NOT outputs change state, 2Q going low and 2Q NOT going high. The transition on line 327 causes counter 333 to be incremented one count. With 2Q NOT high at one input of NAND gate 321, upon the next change in state to the second input to the NAND gate, from the clock signal on link 323, i.e. its next positive going edge, the output of NAND gate 321 resets register 305.

Since the contents of counter 333 are no longer cleared, a non-zero binary code value is coupled through buffer 337 to time constant scaling network 339. This minimum code value stored in counter 333 cause the least valued resistor-capacitor combination to be coupled to pulse generator 343, which eventually generates an output over link 315 to the first clock input of 'count down' register 353. The output of pulse generator 343 initiates the operation of 'count down' register in a manner substantially the same as described above for the operation of 'count up' register 305, in response to a pulse signal on line 301.

Namely, when the (low frequency) output clock signal from pulse generator 343 goes high at clock input 351 of count-down register 353, a logical zero (ground potential applied to its first D input) is loaded into the first stage of the register, causing its Q output to go low and its Q NOT output to go high. Since its Q NOT output is coupled to the second D input of the register, then upon next positive going transition of the clock signal on link 309, the 2Q and 2Q NOT outputs of 'count down' register 353 change state, 2Q going low and 2Q NOT going high. The 2Q output is also coupled over link 362 to driver circuit 363, so that a pulse is applied via link 364 to the stepper motor. The 2Q transition on line 352 also causes up/down counter 333 to be decremented one count, which, in the present illustration is back to its original zero value state. With 2Q NOT high at one input of NAND gate 361, upon the next change in state to the second input to the NAND gate, from the clock signal on link 323, i.e. its next positive going edge, the output of NAND gate 361 resets count-down register 353.

As pointed out above, the timing diagram and accompanying explanation of the operation of the control circuit present the signal flow path operations for a single input pulse. In reality, however, a pulse stream, rather than a single pulse will be coupled over link 301 from the control processor. This sequence of pulses will therefore being continuously incrementing up/down counter 331 and thereby causing the scaling code inputs to time constant control network 339 to change. This ongoing change in the frequency control input to pulse generator 343, in turn, causes the frequency of its output signal to increase, thus ramping up the rate at which 'count-down' register 353 is clocked by pulse generator 343 and thereby ramping up the rate at which stepper motor drive pulses are output by driver circuit 363. At the same time, as the 2Q output of 'count-down' register 353 is fed back over line 352, to decrement up/down counter 333, the contents of counter 333 are caused to change at a reduced rate, until counter 333 eventually reaches an equilibrium condition in which it is being incremented by the pulse stream on input link 301 at the same rate as it is being decremented by the output of pulse generator 343 on link 351.

As long as control processor 271 continues to output high speed (5000 pps) pulses on link 301, the motor continues to be advanced at its maximum rate. As the motor approaches the end of its advance, processor 271 terminates the supply of pulses on line 301 so that up/down counter 333 is no longer incremented. Since its only active input is a count down signal on line 352 (at a clock frequency of 5 KHz, corresponding to the maximum motor advance rate of 5000 pps) up/down counter begins to be decremented very rapidly. However, in a manner converse to its incrementing operation, as its contents are reduced, the binary code value of the RC time constant input to pulse generator 343 becomes smaller and smaller, so that the time constant is gradually increased, thereby effectively ramping down the output pulse rate of generator 343 and, consequently, the pulse rate of the stepper motor drive pulses supplied by driver circuitry 363.

It can be seen, therefore, that by virtue of the combination of the up/down counter 333, its associated scaling network 339 and the feedback mechanism (through 'count down' register 353) from pulse generator 343, the pulse output rate of the pulse generator may initially be ramped up to a preset motor drive representative rate by the input pulse train. Then, once the input pulse train is terminated in accordance with the intended advance of the motor, the contents of the up/down counter begin to decrease, rapidly at first and then gradually as the frequency of the pulse generator is ramped down in accordance with the decreasing contents of the counter. Throughout this process all drive pulses are coupled to the stepper motor in accordance with output pulses generated by the variable frequency pulse generator.

As noted earlier, for limited travel distances, where ramping the motor would not be effective, control processor 271 bypasses the ramping mechanism and couples the pulse stream directly through driver circuit 363 to the motor.

As will be appreciated from the foregoing description, the plotter apparatus according to the present invention not only does not suffer from the paper size and cumbersome hardware constraints of conventional roller and bed type plotter systems, but is configured so that it may be readily disassembled, making it portable in a practical sense. In addition, since the plotter is not constrained by mounting/support hardware, it may be readily mounted for use on substantially any plotting surface regardless of its size. Also pen movement speed is optimized by a stepper motor drive unit that selectively supplies drive pulses to each respective stepper motor at a fixed, moderate pulse repetition rate for pen movement over relatively small drawing areas and, for larger drawing areas, at a variable pulse repetition rate through which the stepper motor speed is ramped up to its maximum and subsequently gradually decreased, so as to slow down the motor to a stop. This ramping up and ramping down of the stepper motor pulse stream enables the motor to be quickly brought up to its maximum operating speed, thereby minimizing pen travel time, while preventing the motor from locking at start up and avoiding overshoot at the end of the motor's excursion.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. An apparatus for controllably translating an instrument across a workpiece and controllably causing said instrument to engage said workpiece comprising:
   a first translation arm, extending in a first direction and including first and second spaced apart support elements which support said first translation arm upon a support surface;
   a second translation arm upon which said instrument is mounted for controlled translation therealong;
   a translation arm coupler, which couples a first portion of said second translation arm to said first translation arm and enables said second translation arm to be translated in said first direction along said first translation arm;
   a third support element, coupled to a second portion of said second translation arm and supporting said second translation arm on said support surface, so that said third support element moves with said second arm during its translation across said support surface;
   an instrument retaining member, supported for translational movement in said second direction along said second translation arm, and retaining an instrument for controllable engagement with said workpiece; and
   a drive unit, coupled with said translation arm coupler and said instrument retaining member and being disengaged from said support surface, said drive unit being operative to controllably translate said translation arm coupler and thereby said second translation arm in said first direction along said first translation arm, irrespective of the placement of said apparatus on said support surface.

2. An apparatus according to claim 1, wherein said instrument retaining member includes an instrument displacement device which is operative to controllably cause said instrument to engage said workpiece.

3. An apparatus according to claim 2, wherein said instrument retaining member further includes an instrument support which retains said instrument such that said instrument effectively floats on said workpiece as said instrument is translated in said first and second directions.

4. An apparatus according to claim 2, wherein said instrument displacement device comprises a controlled solenoid unit, coupled with said instrument, for controllably translating said instrument into and out of engagement with said workpiece.

5. An apparatus according to claim 4, wherein said instrument comprises a plotting pen.

6. An apparatus according to claim 1, wherein said drive unit includes first and second drive motors, mounted to said translation arm coupler and being respectively coupled to translate said translation arm coupler along said first translation arm and to translate said instrument retaining member along said second translation arm.

7. An apparatus according to claim 1, wherein said drive unit includes first and second stepper motors, mounted to said translation arm coupler and being respectively coupled to incrementally translate said translation arm coupler along said first translation arm and to translate said instrument retaining member along said second translation arm, for incremental translation thereof in said first and second directions.

8. An apparatus according to claim 7, wherein said first translation arm includes a rack mounted thereon and said translation arm coupler includes a pinion mechanism which engages said rack and thereby enables said translation arm coupler and thereby said second translation arm to be translated in said first direction.

9. An apparatus according to claim 8, wherein said second translation arm contains a drive belt, coupled to said instrument retaining member and to said second stepper motor, said drive belt extending between first and second locations of second translation arm and being incrementally driven by the operation of said second stepper motor, so as to cause said instrument retaining member to be translated along said second translation arm between the first and second locations thereof.

10. An apparatus according to claim 7, wherein said drive unit includes a drive pulse supply circuit which selectively supplies drive pulses to a respective stepper motor at a first prescribed pulse repetition rate for a first region of translation of said instrument on said workpiece, and at a varying pulse repetition rate for a second region of translation of said instrument on said workpiece.

11. An apparatus according to claim 10, wherein said drive pulse supply circuit includes a pulse supply controller which gradually increases the supply of drive pulses to said respective stepper motor, so as to bring the speed of said respective stepper motor up to a prescribed speed, and subsequently gradually decreases the supply of drive pulses to said respective stepper motor, so as to gradually slow down the speed of said respective stepper motor.

12. An apparatus according to claim 11, wherein said pulse supply controller comprises an up/down counter to which a prescribed number of stepping control pulses, representative of a preselected advance of said respective stepper motor, are coupled, a variable frequency pulse generator, the output frequency of which is controllable, an adjustable time constant circuit for controlling the output frequency of said variable frequency pulse generator in accordance with the contents of said up/down counter, a circuit for decreasing the contents of said up/down counter in accordance with output pulses generated by said variable frequency pulse generator, and a circuit for supplying stepper motor drive pulses to said respective stepping motor in accordance with output pulses generated by said variable frequency pulse generator.

13. An apparatus according to claim 12, wherein said adjustable time constant circuit includes means for controlling the output frequency of said variable frequency pulse generator, and thereby the advance of said respective stepper motor, in proportion to the contents of said up/down counter.

14. An apparatus according to claim 13, wherein said adjustable time constant comprises a resistor/diode ladder network, respective legs of which are coupled to respective stages of said up/down counter and an output of which is coupled to a frequency control input of said variable frequency pulse generator.

15. An apparatus according to claim 1, wherein said translation arm coupler has first, second and third translation arm connection locations, and wherein said first translation arm includes first and second, generally rectilinear arm portions, which are engageable with the first and second translation arm connection locations of said translation arm coupler so as to extend in said first direction therefrom, and wherein one end of said second translation arm is engageable with the third translation arm connection location of said translation arm coupler so as to extend in said second direction therefrom.

16. An apparatus according to claim 15, wherein said drive unit includes first and second drive motors, controllably operated independently of one another, supported by said translation arm coupler and being respectively coupled to said second translation arm and to said instrument retaining member.

17. An apparatus according to claim 16, wherein said first and second drive motors respectively comprise first and second stepper motors, operative to effect controlled independent incremental translation of said second translation arm and said instrument retaining member in said first and second directions.

18. An apparatus for controllably translating an instrument across a workpiece and controllably causing said instrument to engage said workpiece comprising:
a translation arm coupler having first, second and third translation arm connection locations;
a first translation arm, including first and second arm portions, which are engageable with the first and second translation arm connection locations of said translation arm coupler so as to extend in mutually opposite directions therefrom, said first and second arm portions having respective first and second support elements which support said first and second arm portions upon a support surface;
a second translation arm upon which said instrument is mounted for controlled translation therealong, one end of said second translation arm being engageable with the third translation arm connection location of said translation arm coupler so that said second translation arm extends in a direction non-parallel with respect to said mutually opposite directions, and having a third support element, coupled to a location of said second translation arm that is spaced apart from the one end thereof, and which supports said second translation arm on said support surface, so that said third support element moves with said second arm during its translation across said support surface;
an instrument retaining member, supported for translational movement in said non-parallel direction along said second translation arm, and retaining an instrument for controllable engagement with said workpiece; and
a drive unit, supported by said translation arm coupler and being coupled to said instrument retaining member such that the operation of said drive unit does not require engagement with said support surface, said drive unit being operative to controllably translate said translation arm coupler and thereby said second translation arm in either of said mutually opposite directions, irrespective of the placement of said apparatus on said support surface.

19. An apparatus according to claim 18, wherein said drive unit includes first and second drive motors, mounted to said translation arm coupler and being respectively coupled to translate said translation arm coupler along said first translation arm and to translate said instrument retaining member along said second translation arm.

20. An apparatus according to claim 19, wherein said instrument retaining member includes an instrument displacement device which is operative to controllably cause said instrument retained by said instrument retaining member to engage said workpiece, and an instrument support which retains said instrument such that said instrument effectively floats on said workpiece as said instrument retaining is translated thereacross.

21. An apparatus according to claim 20, wherein said instrument displacement device comprises a controlled solenoid unit, coupled with said instrument, for controllably translating said instrument into and out of engagement with said workpiece.

22. An apparatus according to claim 19, wherein said first translation arm includes a rack mounted thereon and said translation arm coupler includes a pinion mechanism which engages said rack and thereby enables said translation arm coupler and thereby said second translation arm to be translated in either of said mutually opposite directions.

23. An apparatus according to claim 22, wherein said second translation arm contains a drive linkage, coupled to said instrument retaining member and to said second motor, said drive linkage extending between first and second locations of said second translation arm and being driven by the operation of said second motor, so as to cause said instrument retaining member to be translated along said second translation arm.

24. An apparatus according to claim 19, wherein said drive unit includes a drive pulse supply circuit which selectively supplies drive pulses to a respective one of said motors at a first prescribed pulse repetition rate for a first region of translation of said instrument on said workpiece, and at a varying pulse repetition rate for a second region of translation of said instrument on said workpiece.

25. An apparatus according to claim 24, wherein said drive pulse supply circuit includes a pulse supply controller which gradually increases the supply of drive pulses to said respective motor, so as to bring the speed of said respective motor up to a prescribed speed, and subsequently gradually decreases the supply of drive pulses to said respective motor, so as to gradually slow down the speed of said respective motor.

26. An apparatus according to claim 25, wherein said pulse supply controller comprises an up/down counter to which a prescribed number of stepping control pulses, representative of a preselected advance of said respective motor, are coupled, a variable frequency pulse generator, the output frequency of which is controllable, an adjustable time constant circuit for controlling the output frequency of said variable frequency pulse generator in accordance with the contents of said up/down counter, a circuit for decreasing the contents of said up/down counter in accordance with output pulses generated by said variable frequency pulse generator, and a circuit for supplying motor drive pulses to said respective motor in accordance with output pulses generated by said variable frequency pulse generator.

27. An apparatus according to claim 26, wherein said adjustable time constant circuit includes means for controlling the output frequency of said variable frequency pulse generator, and thereby the advance of said respective motor, in proportion to the contents of said up/down counter.

28. An apparatus according to claim 27, wherein said adjustable time constant circuit comprises a resistor/diode ladder network, respective legs of which are coupled to respective stages of said up/down counter and an output of which is coupled to a frequency control input of said variable frequency pulse generator.

29. An apparatus for controllably translating an instrument across a workpiece and controllably causing said instrument to engage said workpiece comprising:
a generally T-configured, dual axis, instrument transport assembly including a first rectilinear translation arm, extending in a first axial direction, and supported at spaced apart locations thereof on a support surface, so as to form the top of a T-configuration of said assembly, and a second rectilinear translation arm, forming the vertical leg of said T-configuration, a first end of said second rectilinear translation arm being coupled to said first rectilinear translation arm, so that said second rectilinear translation arm extends in a second axial direction, generally orthogonal to said first axial direction, said second rectilinear translation arm free-travelling on said support surface;
an instrument fixture, supported on said second rectilinear translation arm, for translational movement in said second axial direction, and retaining said instrument for controllable engagement with said workpiece; and
a drive unit, integrally mounted with and supported by said generally T-configured, dual axis, instrument transport assembly such that the operation of said drive unit does not require engagement with said support surface, said drive unit being operative to controllably translate both said second rectilinear translation arm in said first axial direction along said first rectilinear translation arm, and said instrument fixture in said second direction along said second rectilinear translation arm.

30. An apparatus according to claim 29, wherein said instrument fixture includes an instrument displacement device which is operative to controllably cause said instrument retained by said instrument fixture to engage said workpiece, and an instrument support which retains said instrument such that said instrument effectively floats on said workpiece as said instrument fixture is translated thereacross.

31. An apparatus according to claim 30, wherein said instrument displacement device comprises a controlled solenoid unit, coupled with said instrument, for controllably translating said instrument into and out of engagement with said workpiece.

32. An apparatus according to claim 30, wherein said instrument comprises a plotting pen.

33. An apparatus according to claim 29, wherein said drive unit comprises first and second stepper motor units, respectively coupled to incrementally translate said second translation arm and said instrument fixture in said first and second directions.

34. An apparatus according to claim 33, wherein said first translation arm includes a rack mounted thereon and said first end of said second translation arm is coupled to said first translation arm by means of a pinion mechanism engaging said rack and coupled to said first stepper motor for enabling said second translation arm to be translated in said first direction.

35. An apparatus according to claim 34, wherein said second translation arm contains a drive linkage, coupled to said instrument fixture and said second stepper motor and extending between first and second ends of said second translation arm, said drive linkage being incrementally driven by the operation of said second stepper motor, so as to cause said instrument fixture to be translated along said second translation arm between the first and second ends thereof.

36. An apparatus according to claim 33, wherein said drive unit includes means for selectively supplying drive pulses to a respective stepper motor at a first prescribed pulse repetition rate for a first region of translation of said instrument on said workpiece, and at a varying pulse repetition rate for a second region of translation of said instrument on said workpiece.

37. An apparatus according to claim 29, wherein said drive unit includes a coupling joint that enables said second translation arm to be pivoted away from said support surface about an axis parallel to said first direction.

38. An apparatus according to claim 35, wherein said instrument fixture comprises a sleeve member through which said second translation arm passes, and wherein each of said first and second translation arms has a generally tubular configuration, said second translation arm having a longitudinal slot therealong, and wherein said sleeve member includes means for engaging said drive linkage and supporting said instrument for controlled engagement with said workpiece.

39. An apparatus according to claim 36, wherein said drive pulses selectively supplying means comprises pulse supply control means for gradually increasing the supply of drive pulses to said respective stepper motor, so as to bring the speed of said respective stepper motor up to a prescribed speed, and subsequently gradually decreasing the supply of drive pulses to said respective stepper motor, so as to gradually slow down the speed of said respective stepper motor.

40. An apparatus according to claim 39, wherein said pulse supply control means comprises an up/down counter to which a prescribed number of stepping control pulses, representative of a preselected advance of said respective stepper motor, are coupled, a variable frequency pulse generator, the output frequency of which is controllable, an adjustable time constant circuit for controlling the output frequency of said variable frequency pulse generator in accordance with the contents of said up/down counter, means for decreasing the contents of said up/down counter in accordance with output pulses generated by said variable frequency pulse generator, and means for supplying stepper motor drive pulses to said respective stepping motor in accordance with output pulses generated oy said variable frequency pulse generator.

41. An apparatus according to claim 40, wherein said adjustable time constant circuit includes means for controlling the output frequency of said variable frequency pulse generator, and thereby the advance of said respective stepper motor, in proportion to the contents of said up/down counter.

42. An apparatus according to claim 41, wherein said adjustable time constant circuit comprises a resistor/diode ladder network, respective legs of which are coupled to respective stages of said up/down counter and an output of which is coupled to a frequency control input of said variable frequency pulse generator.

43. An apparatus according to claim 29, wherein said generally T-configured, dual axis, instrument transport assembly includes
   a translation arm coupler, to which said drive unit is mounted, said translation arm coupler having first, second and third translation arm connection locations,
   a first translation arm, including first and second arm portions, which are engageable with the first and second translation arm connection locations of said translation arm coupler so as to extend in mutually opposite directions therefrom, said first and second arm portions having respective first and second support elements which support said first and second arm portions upon a support surface, and
   a second translation arm upon which said instrument is mounted for controlled translation therealong, one end of said second translation arm being engageable with the third translation arm connection location of said translation arm coupler so that said second translation arm extends in a direction non-parallel with respect to said mutually opposite directions, and having a third support element, coupled to a location of said second translation arm that is spaced apart from the one end thereof, and which supports said second translation arm on said support surface, so that said third support element moves with said second arm during its translation across said support surface.

44. An apparatus according to claim 43, wherein said drive unit comprises first and second drive motors, controllably operated independently of one another and being respectively coupled to translate said second translation arm and said instrument fixture independently of one another.

* * * * *